US012602233B2

(12) United States Patent
Benhammadi

(10) Patent No.: US 12,602,233 B2
(45) Date of Patent: Apr. 14, 2026

(54) BOOT PROGRAM EMULATION METHOD

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 62 days.

(21) Appl. No.: 18/430,825

(22) Filed: Feb. 2, 2024

(65) Prior Publication Data

US 2024/0264844 A1 Aug. 8, 2024

(30) Foreign Application Priority Data

Feb. 3, 2023 (FR) ...................................... 2301052

(51) Int. Cl.
| | |
|---|---|
| *G06F 9/4401* | (2018.01) |
| *G06F 9/445* | (2018.01) |
| *G06F 21/60* | (2013.01) |
| *G06F 21/78* | (2013.01) |

(52) U.S. Cl.
CPC ............ *G06F 9/4403* (2013.01); *G06F 21/78* (2013.01); *G06F 9/4401* (2013.01); *G06F 9/445* (2013.01); *G06F 21/60* (2013.01)

(58) Field of Classification Search
CPC ...... G06F 9/4401; G06F 9/4403; G06F 21/78; G06F 9/445; G06F 21/60

USPC ......................... 713/2; 711/163, 173; 726/27
See application file for complete search history.

(56) References Cited

U.S. PATENT DOCUMENTS

| | | | | |
|---|---|---|---|---|
| 6,633,976 B1* | 10/2003 | Stevens | ................ | G06F 9/4401 713/2 |
| 10,885,196 B2* | 1/2021 | Laffey | ................... | G06F 21/577 |
| 2007/0073995 A1* | 3/2007 | Rudelic | .............. | G06F 12/1433 711/E12.1 |
| 2007/0226478 A1* | 9/2007 | Rudelic | .............. | G06F 12/1408 713/1 |
| 2012/0210115 A1* | 8/2012 | Park | ...................... | H04L 9/3247 713/2 |
| 2015/0019856 A1* | 1/2015 | Kim | ...................... | G06F 21/575 713/1 |
| 2015/0371046 A1* | 12/2015 | Chen | ..................... | G06F 21/575 713/2 |
| 2022/0113879 A1* | 4/2022 | Samuel | .............. | G06F 12/1441 |

FOREIGN PATENT DOCUMENTS

GB        2557305 A        6/2018

OTHER PUBLICATIONS

INPI Search Report and Written Opinion for priority application, FR Appl. No. 2301052, report dated Oct. 13, 2023, 12 pgs.

* cited by examiner

*Primary Examiner* — Ji H Bae

(74) *Attorney, Agent, or Firm* — Crowe & Dunlevy LLC

(57) ABSTRACT

In a method of emulation of N boot programs in a memory, N being an integer greater than 2, the size of a no-access region of the memory containing the boot programs is increased in response to execution of each boot program.

14 Claims, 3 Drawing Sheets

BOOT PROGRAM EMULATION METHOD

PRIORITY CLAIM

This application claims the priority benefit of French Application for Patent No. 2301052, filed on Feb. 3, 2023, the content of which is hereby incorporated by reference in its entirety to the maximum extent allowable by law.

TECHNICAL FIELD

The present description generally concerns methods of boot program emulation in a memory as well as circuits implementing these methods.

BACKGROUND

Many electronic circuits such as microcontrollers use a boot program (BOOT) which is loaded into a non-volatile memory of the circuit at the booting to then execute a boot application. For security reasons, once executed, the boot program has to be made inaccessible from the outside of the circuit. This particularly raises an issue when a plurality of successive boot programs have to be executed.

There is a need to provide a method which allows the implementation of at least three boot programs while guaranteeing their securing after their execution.

There is a need to overcome all or part of the disadvantages of known methods.

SUMMARY

An embodiment provides a method of emulation of N boot programs in a memory, N being and integer greater than 2, wherein a size of a no-access region of the memory containing the boot programs once executed increases once each program has been executed.

In an embodiment, the boot programs are loaded one after the other in successive zones of the memory, the access to each zone being blocked once the concerned program has been executed, by enlargement of the no-access region.

In an embodiment, each boot program, starting from the second boot program, is loaded into the memory after a previous boot program once the access thereto has been closed by enlargement of the no-access region.

In an embodiment, the size of the no-access region of the memory is defined by the content of a first volatile storage register, having its value incremented by the value of enlargement of the region at each end of execution of a program.

In an embodiment, the increment of the value contained in the first volatile storage register is in number of memory sectors.

In an embodiment, the first volatile storage register is monotonously increasing.

In an embodiment, the content of a second volatile storage register comprises the value defining a status, authorized or closed, of the access to the no-access region.

In an embodiment, the second volatile storage register can only be reset by a resetting of the memory.

In an embodiment, the second volatile storage register is over 1 bit.

In an embodiment, the second volatile storage register is over a plurality of bits.

In an embodiment, the two values defining the status of the access to said no-access region are distant by more than one bit.

In an embodiment, when the content of the second volatile storage register is different from one of said two values, the access to the no-access region is closed until the resetting of the memory.

In an embodiment, when the content of the second volatile storage register is different from one of said two values, the content of the first volatile storage register can no longer be modified.

In an embodiment, a maximum size of the no-access region is predefined, and application programs can only be loaded outside of said no-access region.

An embodiment provides an electronic circuit configured to implement one of the above methods.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
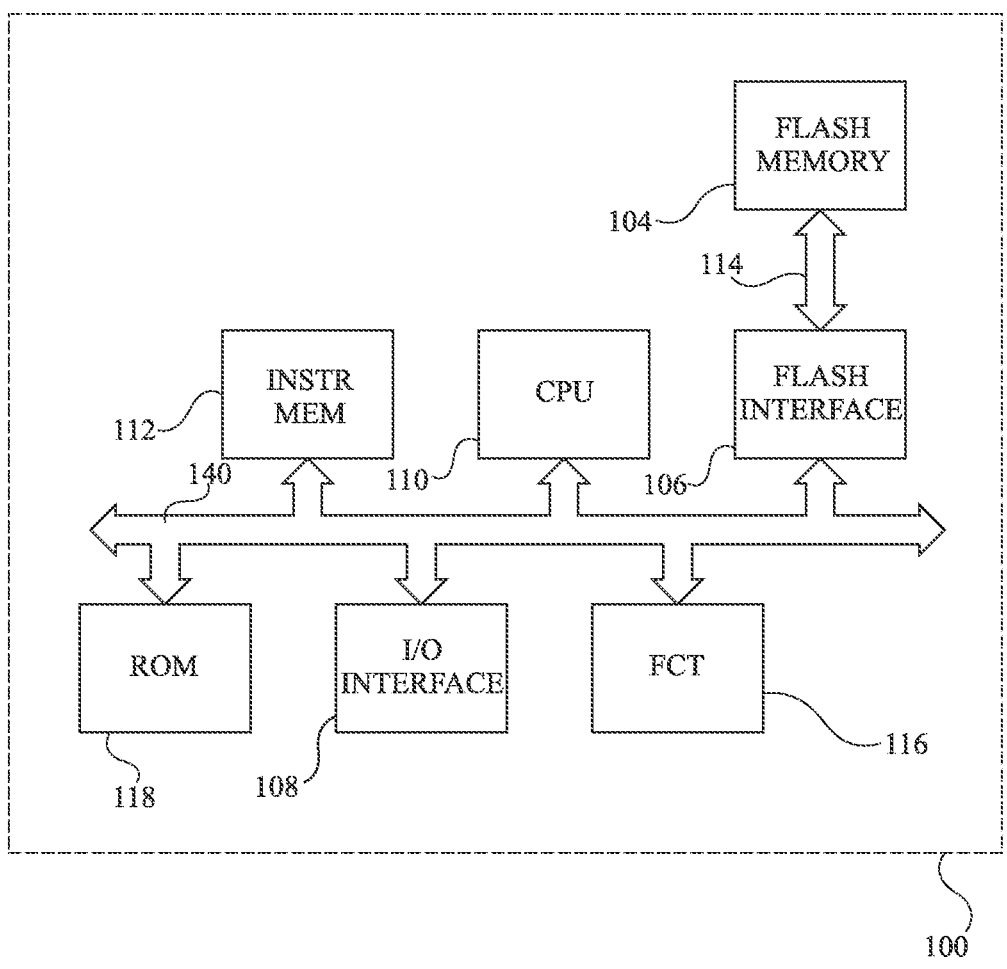
FIG. 1 very schematically shows in the form of blocks an example of an integrated circuit of the type to which the described embodiments apply.

FIG. 1 very schematically shows, in the form of blocks, an example of an integrated circuit 100 of the type to which the described embodiments apply.

Circuit 100 comprises a non-volatile memory 104 (FLASH MEMORY), for example of FLASH memory type, capable of communicating, via a communication bus 114, with a non-volatile memory interface 106 (FLASH INTERFACE) configured to write or read data into and from non-volatile memory 104.

Circuit 100 further comprises, for example, a processing unit 110 (CPU) comprising one or a plurality of processors under control of instructions stored in an instruction memory 112 (INSTR MEM). Instruction memory 112 is, for example, a volatile memory of random access type (RAM). Processing unit 110 and memory 112 communicate, for example, via a system (data, address, and control) bus 140. FLASH memory 104 is coupled to system bus 140 via non-volatile memory interface 106 and via bus 114. Device 100 further comprises an input/output interface 108 (I/O interface) coupled to system bus 140 to communicate with the outside.

Device 100 may integrate other circuits implementing other functions (for example, one or a plurality of volatile and/or non-volatile memories, other processing units), symbolized by a functional block 116 (FCT) in FIG. 1. Among these other circuits, circuit 100 comprises, for example, a ROM or static memory 118 (ROM).

The described embodiments concern the emulation of multiple levels of boot programs in FLASH memory 104. For this purpose, the boot programs are, for example, directly transferred to memory 104 during in-factory programming processes. However, the content of a FLASH memory can in principle be modified. Now, it must be ascertained, for example in the case of the loading of a plurality of operating systems, that they cannot be modified once they have been transferred into FLASH memory 104, except for a resetting of system or circuit 100.

An example concerns OEM-type operating systems, which have to be loaded, during manufacturing processes of circuit 100 at the initialization of the system, into FLASH memory 104 to be able to then be executed at each booting of the system. However, once in the flash memory, the access to the boot program must be protected from other boot programs, from any application, or from an access from the outside of the circuit to avoid for it to be modified. For this purpose, it is provided to lock the access to the zone of the FLASH memory containing the boot program so that it is impossible to have access thereto except for a rebooting of the circuit.

A difficulty lies in the fact of providing this functionality while a plurality of boot programs, of different levels, are likely to be transferred to FLASH memory 104.

The described embodiments provide an increase of the size of a no-access region of memory 104 containing the boot programs once each program has been executed.

The lower-level boot programs thus have an access protected against the new boot programs subsequently loaded and executed.

Figure 2:
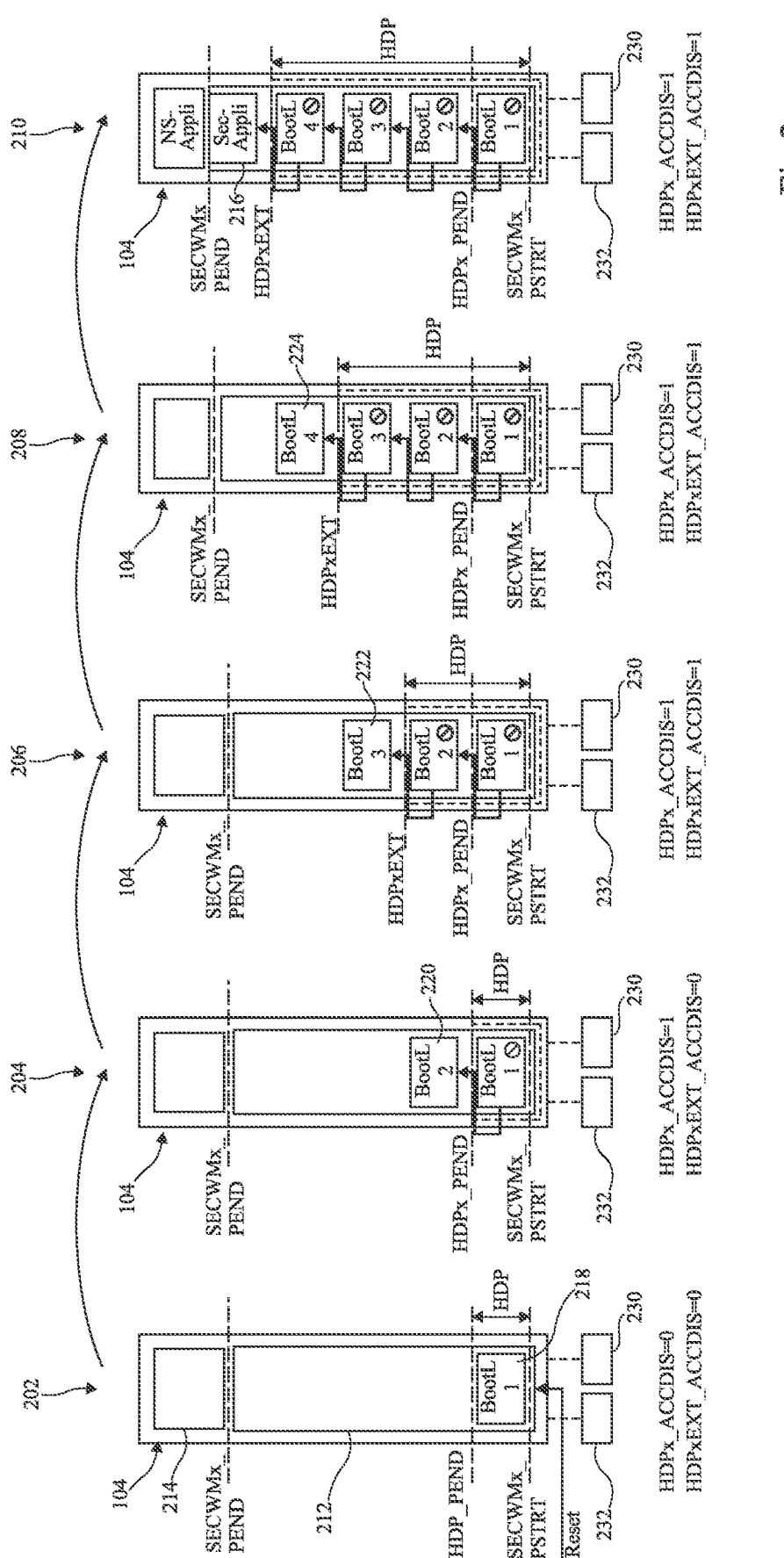
FIG. 2 illustrates an implementation mode of a method of emulation of a plurality of boot programs in a memory.

FIG. 2 illustrates an implementation mode of method of emulation of a plurality of boot programs in memory 104.

Figure 3:
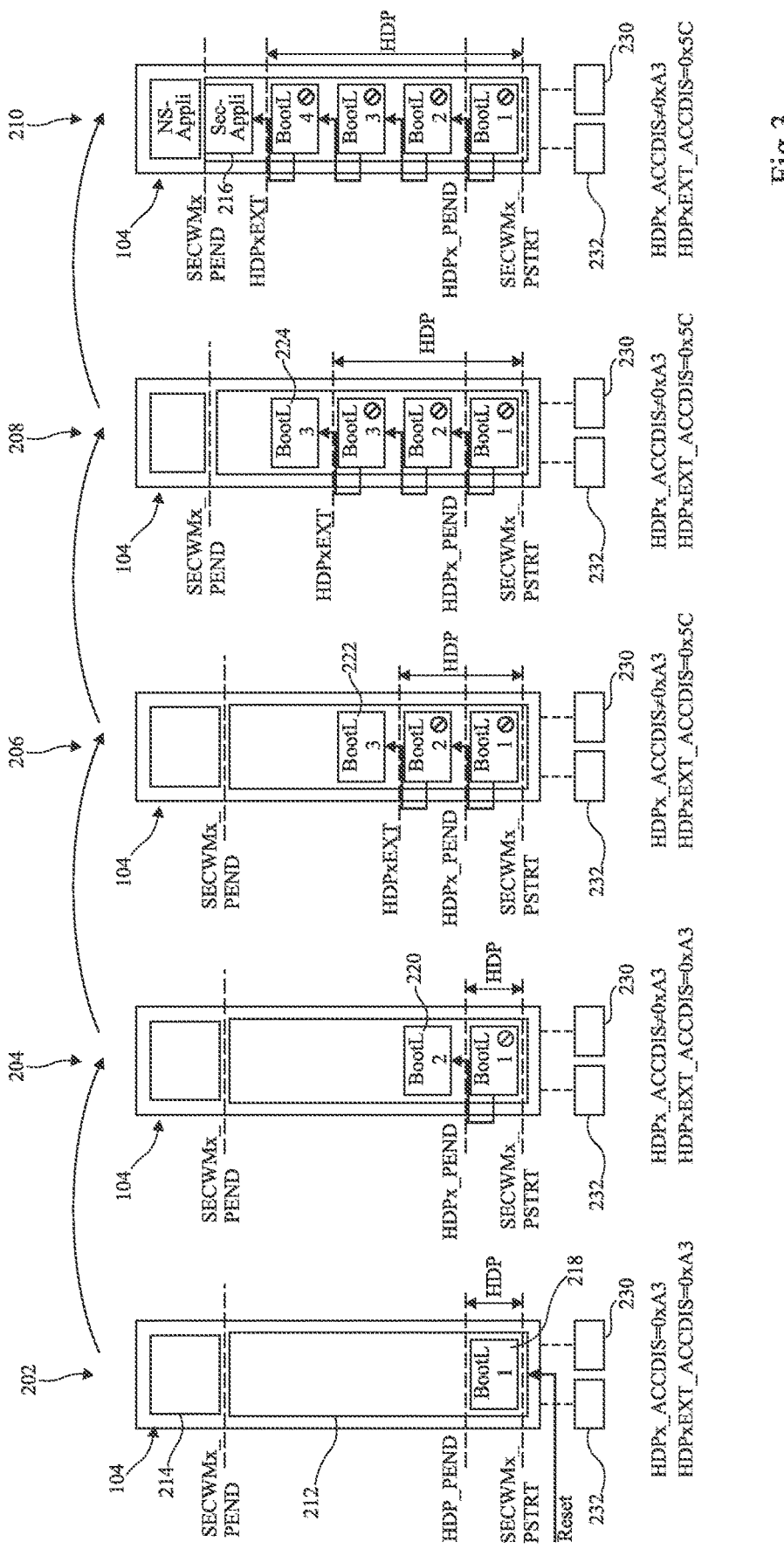
FIG. 3 illustrates another implementation mode of a method of emulation of a plurality of boot programs in a memory.

FIG. 3 shows, in the form of blocks, steps of another implementation mode of a method of emulation of a plurality of boot programs in memory 104.

In the example of FIGS. 2 and 3, memory 104 is partitioned into a region 214 and a region 212 having its dimensions defined by user option bytes SECWMx_PEND and SECWMx_PSTRT which are loaded from a non-volatile memory, for example memory 118, at the booting. The data written into region 212 are, for example, encrypted. The data written into region 214 are, for example, not encrypted or encrypted with a lower security level than those of region 212. Although this is not shown in the drawings, the size of region 214 is, in practice, much larger than the size of region 212 (by a ratio of at least 10).

Memory 104 is coupled to a first volatile storage register 230 (HDPxEXT), having a value that can only be incremented, that is, the value in the first register is monotonously increasing. The value contained in the first register is representative, for example, of the size of the no-access region 212 of memory 104. The size of the no-access region 212 is, for example, counted in number of memory sectors.

Memory 104 is also coupled to a second volatile storage register 232 (HDPxEXT_ACCDIS). The second volatile storage register 232 contains a value HDPxEXT_ACCDIS defining a status, authorized (value 0) or closed (value 1), of the access to the no-access region 212 having its size defined by the content HDPxEXT of register 230.

Memory 104 is further coupled to another volatile storage register HDPx_ACCDIS which defines the possibility or the closing of the access to the no-access region 212 between values HDP_PEND and SECWMx_PSTRT.

As an example, contents SECWMx_PSTRT, HDPxEXT, and SECWMx_PEND represent addresses of memory 104, either directly, or in number of sectors.

For simplification, in the following description, the same reference is used to designate a register and the value that it contains.

The method of FIG. 2 comprises successive steps 202, 204, 206, 208, and 210.

At step 202, which corresponds to an initialization of the circuit, the value of HDPx_ACCDIS is at 0, which enables a first boot program (BootL1) to be loaded into one or a plurality of sectors 218 of region 212, between address SECWMx_PSTRT and an address HDPx_PEND defined by user option bytes before the booting. Once loaded, the first boot program is executed, after which its access is closed by the switching from 0 to 1 of value HDPx_ACCDIS. Once at 1, register HDPx_ACCDIS can only be set back to 0 by resetting of the memory. Step 202 also corresponds to a booting or to a resetting (Reset) of the circuit, that is, phases which do not take place in factory on manufacturing or on programming of the circuit but during the standard use of the circuit. In this case, the boot program (BootL1), which has already been loaded into one or a plurality of sectors 218 of region 212 during the factory production phase, is not reloaded but only executed.

At a step 204, which corresponds to an initialization of the circuit, it is assumed that a second boot program (BootL2) is then written into region 212, for example after the first boot program. Then, the program is executed. Step 204 also corresponds to a booting or a resetting of the circuit. In this case, the second boot program (BootL2), which has already been loaded during the factory production phase, is not reloaded but only executed.

At a step 206, which corresponds to an initialization of the circuit, the first volatile storage register HDPxEXT is incremented so that its value is representative of the size of the region of memory 212 comprising the first and second boot programs. The second volatile storage register HDPxEXT_ACCDIS takes value 1, which closes the access to the region having a size defined by register HDPxEXT. The second boot program thus has its access closed for another boot program, for example BootL3. Once at 1, register HDPxEXT_ACCDIS can only be taken back to zero by a resetting of the memory.

It is assumed, when step 206 corresponds to an initialization phase, that a third boot program 222 (BootL3) is then written into region 212 after the second boot program. Then, the program is executed. Step 206 also corresponds to a booting or a resetting of the circuit. In this case, third boot program 222, which has already been loaded during the factory production phase, is not reloaded but only executed.

At a step 208, which corresponds to an initialization of the circuit, first volatile storage register HDPxEXT is incremented so that its value is representative of the size of the region of memory 212 comprising the first, second, and third boot programs. The second volatile storage register HDPxEXT_ACCDIS remains at value 1, which closes the access to the region, increased by the third boot program, having its size defined by register HDPxEXT.

If, as illustrated in FIG. 2, an additional boot program is to be written, this fourth boot program 224 (BootL4) is then written into region 212, for example after the third boot program. Due to the value of HDPxEXT_ACCDIS which is at 1 and the value of HDPxEXT which then corresponds to a region size encompassing the first, second, and third boot programs, the first, second, and third boot programs have their access closed for the fourth boot program. The fourth boot program is then executed. Step 208 also corresponds to a booting or a resetting of the circuit. In this case, fourth boot program 224, which has already been loaded during the factory production phase, is not reloaded but only executed.

At a step 210, first volatile storage register HDPxEXT is incremented so that its value is representative of the size of the region of memory 212 comprising the first, second, third, and fourth boot programs. The second volatile storage register HDPxEXT_ACCDIS remains at value 1, which closes the access to the region, increased by the fourth boot program, having its size defined by register HDPxEXT.

In the example of FIG. 2, when HDPxEXT reaches the predefined value corresponding to a region encompassing the four first boot programs, application programs 216 (Sec-Appli, NS-Appli) may be loaded outside of the no-access region between SECWMx_PEND and HDPxEXT or into region 214. These applications cannot have access to the no-access region defined with HDPxEXT due to value HDPxEXT_ACCDIS which is 1, which, in the example of FIG. 2, closes the access to the region having its size defined by register HDPxEXT.

A resetting of the memory at any time of steps 202 to 210, restarts the emulation method at step 202, for example.

FIG. 3 illustrates another implementation mode of a method of emulation of a plurality of boot programs in a non-volatile memory.

The method illustrated in FIG. 3 is similar to that of FIG. 2 but for the fact that registers HDPx_ACCDIS and HDPxEXT_ACCDIS are this time over a plurality of bits and more particularly over 8 bits in the shown example.

In the example associated with FIG. 3, when the content of register HDPx_ACCDIS is equal to 0xA3, the access to the region defined by register HDP_PEND, that is, between HDP_PEND and SECWMx_PSTRT, is authorized. For the other values of register HDPx_ACCDIS, the access to the relative region defined by register HDP_PEND is closed. Further, the access to value HDPx_ACCDIS depends on its current value. When the value of register HDPx_ACCDIS is different from 0xA3, the write access to this same register HDPx_ACCDIS is closed.

In the example associated with FIG. 3, when register HDPxEXT_ACCDIS has value 0xA3, the access to the region having its size defined by HDPxEXT is authorized.

When register HDPxEXT_ACCDIS has value 0x5C, the access to the region having its size defined by register HDPxEXT, as well as the region defined by counter HDP, is closed. However, register HDPxEXT may be incremented.

For other values of register HDPxEXT_ACCDIS different from 0xA3 and 0x5C, the access to the region having its size defined by register HDPxEXT is closed and any writing into register HDPxEXT is closed until a resetting of memory

104. The value of register HDPxEXT_ACCDIS can further no longer be modified before the resetting of the memory.

The following Table 1 summarizes the possibilities of write access to registers HDPxEXT and HDPxEXT_ACCDIS according to the current value of register HDPxEXT_ACCDIS.

TABLE 1

| Value of register | Write access to: | |
| --- | --- | --- |
| HDPxEXT_ACCDIS | HDPxEXT_ACCDIS | HDPxEXT |
| 0xA3 (reset value) | Authorized | Authorized |
| 0x5C | Authorized if the value to be written is different from 0xA3. Otherwise the write access is closed. | Authorized if the new value is greater than the current value. Otherwise the write access is closed. |
| Others | Write access closed. | Write access closed. |

When register HDPxEXT_ACCDIS has, as a current value, 0xA3, then the write access to registers HDPxEXT and HDPxEXT_ACCDIS is authorized. The access to the region having its size defined by register HDPxEXT is authorized.

When register HDPxEXT_ACCDIS has, as a current value, 0x5C, then the write access to register HDPxEXT_ACCDIS is authorized if the value to be written is different from 0xA3. Otherwise, the write access to HDPxEXT_ACCDIS is closed.

When register HDPxEXT_ACCDIS has, as a current value, 0x5C, then the write access to register HDPxEXT is authorized if the new value to be written is greater than the current value, in other words if register HDPxEXT is incremented. Otherwise, the write access is closed.

Finally, when the content of register HDPxEXT_ACCDIS is different from one of the two values 0xA3 and 0x5C, the write access to registers HDPxEXT and HDPxEXT_ACCDIS is closed and the access to the region having its size defined by register HDPxEXT is closed until the resetting of the memory.

At step 202 of FIG. 3, after the resetting, registers HDPx_ACCDIS and HDPxEXT_ACCDIS have value 0xA3, authorizing the writing and the reading in the region having its size defined by register HDP_PEND.

At step 204 of FIG. 3, register HDPxEXT_ACCDIS keeps value 0xA3 while register HDPx_ACCDIS is set to a value different from 0xA3, which closes the access to the region having its size defined by register HDP_PEND. Once register HDPx_ACCDIS is set to a value different from 0xA3, then it is no longer possible to modify it until the resetting of the memory. The access to the region defined by register HDP_PEND is thus closed until the resetting.

At step 206 of FIG. 3, register HDPxEXT_ACCDIS takes value 0x5C, which closes the access to the region having its size defined by register HDPxEXT. The latter may however be incremented after the execution of boot program BootL2.

At steps 208 and 210 of FIG. 3, register HDPxEXT_ACCDIS remains at value 0x5C, which closes the access to the region having its size defined by register HDPxEXT. The latter is however incremented after the execution of boot programs BootL3 and BOOTL4, which enables to close the access to the region having its size incremented at each step defined by the register, that is, the region between the values contained in registers HDPx_PEND and HDPxEXT. The region between the values contained in registers HDPx_PEND and SECWMx_PSTRT already has its access closed for the value taken by register HDPx_ACCDIS.

Values 0xA3 and 0x5C are selected to be sufficiently distant so that a change of these values, caused by an attack or a disturbance, does not give rise to a possibility of access to a region having its access defined as closed or does not give rise to a denial of service. These values are however examples and other values may be envisaged provided to respect a low probability for an attack or a disturbance to switch the content of register from one to the other value. Typically, the two selected values have to be distant by at least two bits.

As compared with the method of FIG. 2, the fact for register HDPxEXT_ACCDIS to be able to have an effect on the access to region HDPxEXT with three values (0xA3, 0x5C, and any other value) enables to obtain an optimal securing against external attacks or disturbances. In particular, this avoids for an intentional (attack) or incidental disturbance to change the value of register HDPxEX-T_ACCDIS to 0, which would make the access to the boot programs of region HDPxEXT possible. According to another example, this avoids an increment of register HDPxEXT beyond application level Sec-Appli or NS-Appli and avoids a denial of access of the applications and a denial of service.

Further, the embodiment shown in relation with FIG. 3 enables to emulate a number of boot programs greater than 2.

Various embodiments and variants have been described. Those skilled in the art will understand that certain features of these various embodiments and variants may be combined, and other variants will occur to those skilled in the art. In particular, although values of registers HDPx_ACCDIS, HDPxEXT_ACCDIS, and HDPxEXT have been shown, in relation with the different embodiments, with values 0 and 1, or 0xA3 and 0x5C, those skilled in the art may implement other values provided to respect the described functionalities.

Finally, the practical implementation of the described embodiments and variants is within the abilities of those skilled in the art based on the functional indications given hereabove, in particular, regarding the number of boot programs likely to be emulated.

The invention claimed is:

1. A method for protecting N boot programs in a memory, N being an integer greater than 2, comprising:
   increasing a size of a no-access region of the memory containing the N boot programs by an enlargement of the no-access region in response to execution of each boot program loaded into the memory, said enlargement having a value;
   wherein the size of the no-access region of the memory is defined by a content of a first volatile storage register;
   further comprising incrementing, in response to an end of execution of each boot program, a value of said content of the first volatile storage register by the value of the enlargement of the no-access region.

2. The method according to claim 1, further comprising:
   loading each the N boot programs into successive zones of the memory; and
   blocking access to each zone once a boot program stored in the zone has been executed;
   wherein blocking comprises enlarging the size of the no-access region of the memory.

3. The method according to claim 1, further comprising loading each boot program, starting from a second one of the N boot programs, into the memory after a previous one of the N boot programs once access to a zone of the memory storing said previous one of the N boot programs has been closed by the enlargement of the no-access region.

4. The method according to claim 1, wherein incrementing the value comprises increasing the value of said content of the first volatile storage register by a number of memory sectors.

5. The method according to claim 1, wherein incrementing the value comprises monotonously increasing.

6. The method according to claim 1, wherein a content of a second volatile storage register comprises a value defining a status for access to the no-access region, wherein the status for access to the no-access region comprises an authorized status or a closed status.

7. The method according to claim 6, further comprising resetting the second volatile storage register only in response to a resetting of the memory.

8. The method according to claim 6, wherein the second volatile storage register stores the value defining the status for access to the no-access region over 1 bit.

9. The method according to claim 6, wherein the second volatile storage register stores the value defining the status for access to the no-access region over a plurality of bits.

10. The method according to claim 9, wherein an authorized status value and a closed status value defining the status for access to said no-access region are distant by more than one bit.

11. The method according to claim 10, further comprising, when the content of the second volatile storage register is different from either of said authorized status value and said closed status value, closing access to the no-access region until a resetting of the memory.

12. The method according to claim 10, further comprising, when the content of the second volatile storage register is different from either of said authorized status value and said closed status value, preventing modification of the content of the first volatile storage register.

13. The method according to claim 1, wherein a maximum size of the no-access region is predefined, and further comprising loading application programs outside of said maximum size of the no-access region.

14. An electronic circuit configured to implement the method according to claim 1.

* * * * *